(12) United States Patent
Liebl et al.

(10) Patent No.: US 11,422,580 B2
(45) Date of Patent: Aug. 23, 2022

(54) CLASS 2 CONTROLLER FOR NON-LIGHT-EMITTING VARIABLE TRANSMISSION DEVICES AND A METHOD OF USING THE SAME

(71) Applicant: SAGE ELECTROCHROMICS, INC., Faribault, MN (US)

(72) Inventors: Troy Liebl, Owatonna, MN (US); David Buszmann, New Market, MN (US)

(73) Assignee: SAGE ELECTROCHROMICS, INC., Faribault, MN (US)

( * ) Notice: Subject to any disclaimer, the term of this patent is extended or adjusted under 35 U.S.C. 154(b) by 0 days.

(21) Appl. No.: 17/066,177

(22) Filed: Oct. 8, 2020

(65) Prior Publication Data
US 2021/0109557 A1 Apr. 15, 2021

Related U.S. Application Data

(60) Provisional application No. 62/915,228, filed on Oct. 15, 2019.

(51) Int. Cl.
| | |
|---|---|
| *G05F 1/66* | (2006.01) |
| *H04W 52/34* | (2009.01) |
| *H02J 13/00* | (2006.01) |
| *H04L 41/0213* | (2022.01) |
| *G06F 1/3209* | (2019.01) |
| *H04W 40/30* | (2009.01) |

(52) U.S. Cl.
CPC ............... *G05F 1/66* (2013.01); *G06F 1/3209* (2013.01); *H02J 13/00016* (2020.01); *H04L 41/0213* (2013.01); *H04W 52/343* (2013.01); *H04W 40/30* (2013.01)

(58) Field of Classification Search
CPC ....... H04L 67/125; G02F 1/163; G06F 1/189; G06F 1/28; G06F 1/3278
USPC .......................................................... 713/300
See application file for complete search history.

(56) References Cited

U.S. PATENT DOCUMENTS

| | | |
|---|---|---|
| 5,973,819 A | 10/1999 | Pletcher et al. |
| 7,266,204 B2 | 9/2007 | Watson et al. |
| 9,778,532 B2 | 10/2017 | Pradhan |
| 10,091,465 B2 | 10/2018 | Dellantoni et al. |
| 10,253,558 B2 | 4/2019 | Vigano et al. |
| 10,365,531 B2 | 7/2019 | Shrivastava et al. |

(Continued)

FOREIGN PATENT DOCUMENTS

| | | |
|---|---|---|
| CN | 107851413 A | 3/2018 |
| EP | 2445172 B1 | 3/2016 |

(Continued)

OTHER PUBLICATIONS

International Search Report and Written Opinion for PCT/US2020/058404, dated Jan. 26, 2021, 11 pages.

*Primary Examiner* — Robert A Cassity
(74) *Attorney, Agent, or Firm* — Abel Schillinger, LLP; Robert N Young (57) ABSTRACT

A system for providing power can include one or more non-light emitting, variable transmission devices, a power device, and one or more class 2 certified controllers, where the power device is configured to provide up to 500 Watts of power to the one or more controllers, and where the controller is configured to provide at most 24 V·A to the one or more non-light emitting, variable transmission devices.

20 Claims, 5 Drawing Sheets

(56) References Cited

U.S. PATENT DOCUMENTS

| | | |
|---|---|---|
| 2005/0251604 A1 | 11/2005 | Gerig |
| 2012/0280637 A1 | 11/2012 | Tikkanen et al. |
| 2014/0312788 A1 | 10/2014 | Tischler et al. |
| 2014/0368899 A1 | 12/2014 | Greer |
| 2017/0077799 A1* | 3/2017 | Wang .................... H02M 7/217 |
| 2017/0122802 A1 | 5/2017 | Brown et al. |
| 2017/0131611 A1 | 5/2017 | Brown et al. |
| 2017/0208667 A1* | 7/2017 | Cartrette ................ H05B 45/10 |
| 2017/0269451 A1 | 9/2017 | Shrivastava et al. |
| 2018/0052429 A1* | 2/2018 | Ryan .................... H05K 7/1467 |
| 2018/0187478 A1* | 7/2018 | Vigano ..................... E06B 9/24 |
| 2019/0138704 A1* | 5/2019 | Shrivastava ............ G06F 21/32 |
| 2019/0171081 A1 | 6/2019 | Zedlitz et al. |
| 2019/0294017 A1* | 9/2019 | Vigano .................. G02F 1/153 |

FOREIGN PATENT DOCUMENTS

| | | |
|---|---|---|
| TW | 201928939 A | 7/2019 |
| WO | 2017192881 A1 | 11/2017 |
| WO | 2018102103 A1 | 6/2018 |
| WO | 2019178282 A1 | 9/2019 |

* cited by examiner

CLASS 2 CONTROLLER FOR NON-LIGHT-EMITTING VARIABLE TRANSMISSION DEVICES AND A METHOD OF USING THE SAME

CROSS-REFERENCE TO RELATED APPLICATION(S)

This application claims priority under 35 U.S.C § 119(e) to U.S. Provisional Application No. 62/915,228, entitled "CLASS 2 CONTROLLER FOR NON-LIGHT-EMITTING VARIABLE TRANSMISSION DEVICES AND A METHOD OF USING THE SAME," by Troy LIEBL and David BUSZMANN, filed Oct. 15, 2019, which is assigned to the current assignee hereof and is incorporated herein by reference in its entirety.

FIELD OF THE DISCLOSURE

The present disclosure is directed to systems that include non-light-emitting variable transmission devices, and more specifically to class 2 classification systems including routers, controllers, and non-light-emitting variable transmission devices and methods of using the same.

BACKGROUND

A non-light-emitting variable transmission device can reduce glare and the amount of sunlight entering a room. Buildings can include many non-light-emitting variable transmission devices that may be controlled locally (at each individual or a relatively small set of devices), for a room, or for a building (a relatively large set of devices). Wiring the devices can be very time consuming and complicated, particularly as the number of devices being controlled increases. Connecting the devices to their corresponding control system can be performed on a wire-by-wire basis using electrical connectors or connecting techniques, such as terminal strips, splicing, soldering, wire nuts, or the like.

However, as power requirements increase, so too do safety concerns in operating a reliable system. A need exists for a better control strategy.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

The use of the word "about," "approximately," or "substantially" is intended to mean that a value of a parameter is close to a stated value or position. However, minor differences may prevent the values or positions from being exactly as stated. Thus, differences of up to ten percent (10%) for the value are reasonable differences from the ideal goal of exactly as described.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the glass, vapor deposition, and electrochromic arts.

A system can include a non-light-emitting, variable transmission device; a class 2 controller coupled and configured to provide power to the non-light-emitting, variable transmission device; and a router configured to provide power and control signals to the controller.

The systems and methods are better understood after reading the specification in conjunction with the figures. System architectures are described and illustrated, followed by an exemplary construction of a non-light-emitting, variable transmission device, and a method of controlling the system. The embodiments described are illustrative and not meant to limit the scope of the present invention, as defined by the appended claims.

Figure 1:
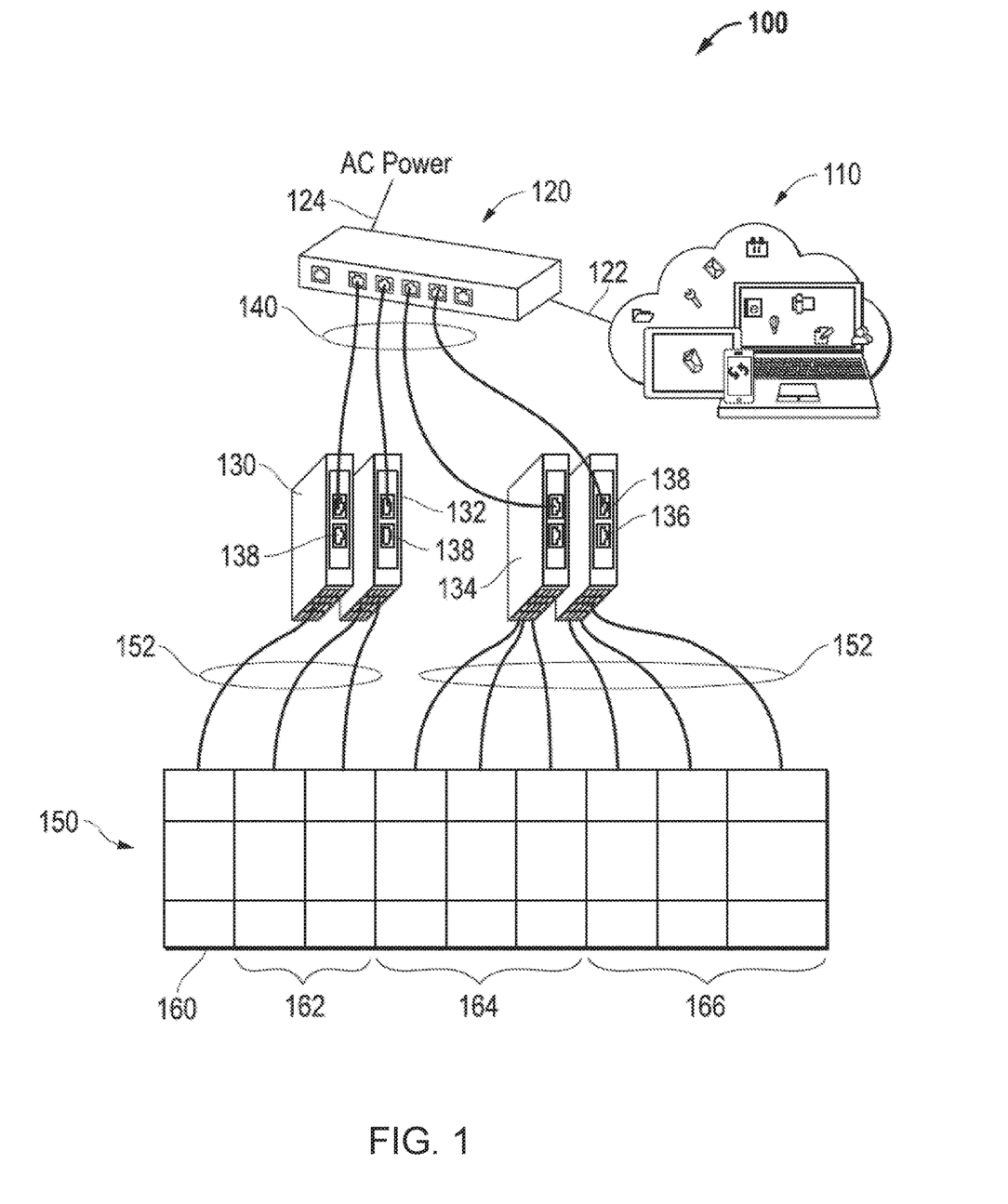
FIG. 1 includes a schematic depiction of a system for controlling a set of non-light-emitting, variable transmission devices in accordance with an embodiment.
Figure 2:
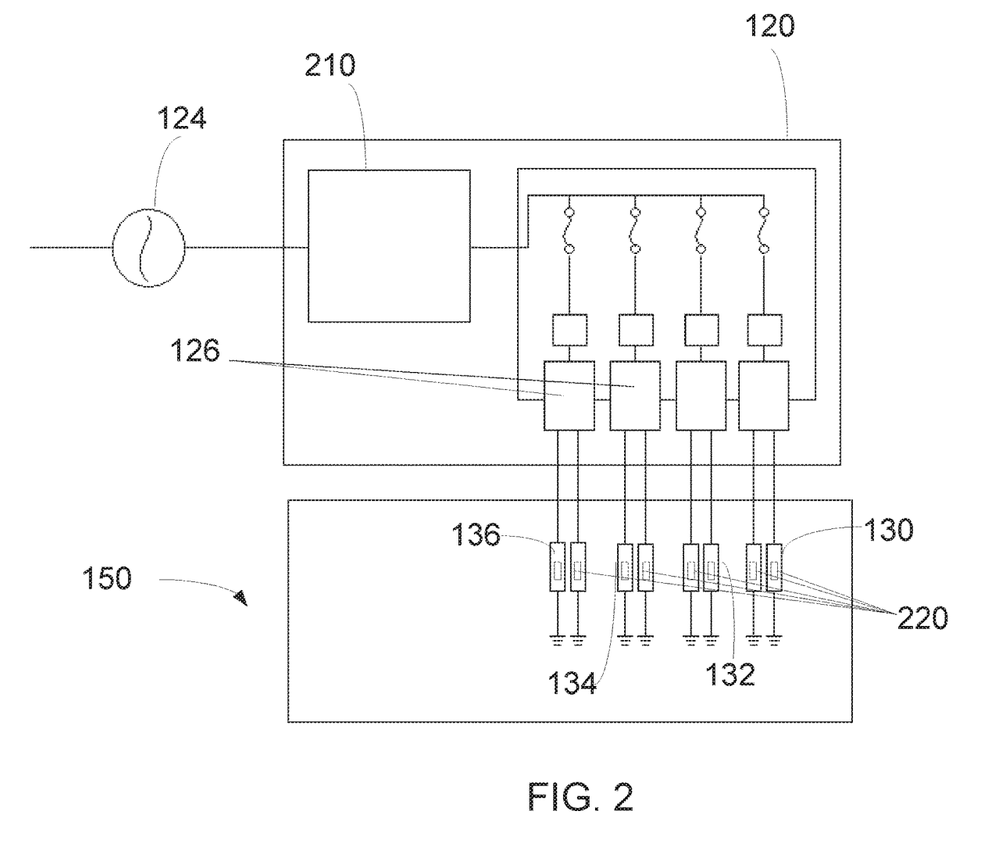
FIG. 2 includes a schematic depiction of a system for controlling a set of non-light-emitting, variable transmission devices in accordance with an embodiment.

Referring to FIG. 1, a system for controlling a set of non-light-emitting, variable transmission devices is illustrated and is generally designated 100. As depicted, the system 100 can include a building management system 110. In a particular aspect, the building management system 110 can include a computing device such as a desk top computer, a laptop computer, a tablet computer, a smartphone, some other computing device, or a combination thereof. The building management system 110 can be used to control the heating ventilation air condition (HVAC) system of the building, interior lighting, exterior lighting, emergency lighting, fire suppression equipment, elevators, escalators, alarms, security cameras, access doors, another suitable component or sub-system of the building, or any combination thereof.

As illustrated in FIG. 1, the system 100 can include a router 120 connected to the building management system 110 via a control link 122. The control link 122 can be a wireless connection. In an embodiment, the control link 122 can use a wireless local area network connection operating according to one or more of the standards within the IEEE 802.11 (WiFi) family of standards. In a particular aspect, the wireless connections can operate within the 2.4 GHz ISM radio band, within the 5.0 GHz ISM radio band, or a combination thereof.

Regardless of the type of control link 122, the building management system 110 can provide control signals to the router 120 via the control link 122. The control signals can be used to control the operation of one or more non-light-emitting variable transmission devices that are indirectly, or directly, connected to the router 120 and described in detail below. As indicated in FIG. 1, the router 120 can be connected to an alternating current (AC) power source 124. The router 120 can include an onboard AC-to-direct current (DC) converter 210. The onboard AC-to-DC converter can convert the incoming AC power from the AC power source 124, between 100 and 240 Volts (V) AC and between 50 and 60 Hz, to a DC voltage that is at most 60 VDC, 54 VDC, 48 VDC, 24 VDC, at most 12 VDC, at most 6 VDC, or at most 3 VDC.

FIG. 1 also indicates that the router 120 can include a plurality of connectors. In a particular aspect, the connectors can include one or more RJ-11 jacks, one or more RJ-14 jacks, one or more RJ-25 jacks, one or more RJ-45 jacks, one or more 8P8C jacks, another suitable jack, or a combination thereof. In another aspect, the connectors can include one or more universal serial bus (USB) jacks. In a particular embodiment, the connectors can be USB-C connectors.

As further illustrated in FIG. 1, the system 100 can include controllers 130, 132, 134, and 136 connected to the router 120. The router 120 can be configured to provide power and control signals to the controllers 130, 132, 134, and 136. In a particular aspect, the router 120 can include a power inlet port and a control signal port. The router 120 can be configured to receive power via a power inlet port 124 and provide power to any or all of the controllers 130, 132, 134, and 136 and receive control signals via a control link and provide control signals to any or all of the controllers 130, 132, 134, and 136. The onboard AC-to-DC converter within the router 120 can be coupled to the power input port of the router 120.

Each of the controllers 130, 132, 134, and 136 can include a plurality of connectors 138. The connectors 138 on the controllers 130, 132, 134, and 136 can include one or more RJ-11 jacks, one or more RJ-14 jacks, one or more RJ-25 jacks, one or more RJ-45 jacks, one or more 8P8C jacks, another suitable jack, or a combination thereof. In another aspect, the connectors 138 can include one or more USB jacks. In a particular embodiment, the connectors 138 can be USB-C connectors. In still another aspect, the connectors on the controllers 130, 132, 134, and 136 can be substantially identical to the connectors of the router 120. The controllers 130, 132, 134, and 136 can further include a component that is configured to reduce a voltage of power received over the power input port to voltages of power transmitted over the controller port to the individual light-emitting, variable transmission devices. The component can include a transformer or a voltage regulator. In one aspect, each controller 130, 132, 134, and 136 can include a class 2 window driver 220. In one embodiment, the controllers 130, 132, 134, and 136 can include a BACnet interface. In another embodiment, the controllers 130, 132, 134, and 136 can include a integrated Ethernet switch and/or wireless interface. In another embodiment, the controllers 130, 132, 134, and 136 can include an SSL chip configured to encrypt communication between the controllers and control device, such as a mobile phone, laptop computer, pc, or other external device.

The National Electrical Code (NEC) provides standards for the safe installation of electrical wiring and equipment in the United States. The NEC is published by the National Fire Protection Association (NFPA) and has been approved as an American national standard by the American National Standards Institute (ANSI). The NEC was drafted at least in part to provide uniform standards across the country with many states and municipalities having adopted the NEC, or some version thereof. The code is formally referred to as ANSI/NFPA 70. Adherence to NEC guidelines promotes safe installation and operation of electrical wiring and equipment.

The NEC classifies circuits into various categories (e.g., class 1, class 2, class 3). Such circuits are defined to include the portion of the wiring system between (a) the load side of an overcurrent protection device (OCPD) or the power-limited supply and (b) all equipment connected thereto. The circuits are classified based on their usage and electrical power and voltage limitations. The NEC imposes limits on class 2 circuits that require a combination of power source and overcurrent protection. In a number of cases, class 2 circuits may be limited to 30 V·A and 100 V·A.

Design of a power distribution network can depend on many factors including, but not limited to, the number of windows installed, the power consumption due to wire resistance, the location of installed windows, the location of building power sources/control panels/other power sources, the layout of windows being installed, the existing infrastructure where windows are being installed, etc. As the need for power increases, so too does the limitation on the circuit distribution network.

Typically, the router 120, which can include a power supply, delivers power to downstream components such as the controllers 130, 132, 134, and 138. While capable of delivering up to 300 V·A of power, the power supply is limited to at most 100 V·A of power in order to remain within the standards of a class 2 classification. However, in many cases the demands for power of the numerous non-light-emitting, variable transition device windows is much higher than what a class 2 power supply can accommodate, thereby necessitating additional class 2 power supplies. In other words, each upstream power supply typically provides power to many non-light-emitting, variable transition device windows and window controllers. In one embodiment, the controller can be powered via an AC/DC power supply.

In the aspects of the present disclosure, the power supply utilizes up to 320 V·A while maintaining the class 2 classification for the circuit distribution network. In another aspects of the present disclosure, the power supply utilizes up to 500 V·A while maintaining the class 2 classification for the circuit distribution network. In order to maintain the safety standard of the NEC, the downstream controllers include a class 2 window driver capable of limiting the voltage from the upstream power supply such that the class 2 window driver can maintain the class 2 classification for the circuit distribution network. As such, a single power supply is instead capable of providing power to up to 30 electochromic windows, such as up to 20 electrochromic windows, or such as up to 16 electrochromic window, thereby eliminating the need for additional power supply units. Specifically, the downstream components, ie window controllers 130, 132, 134, and 136, receive power from the upstream power supply and in turn deliver the regulated power to the windows. In some embodiments, an upstream power supply provides power to at least 3 switchable windows, or at least 5 windows, at least about 10 windows, at least about 20 windows, at least about 30 windows, at least about 40 windows, or at least about 50 windows.

As illustrated in FIG. 1, a plurality of cables 140 can used to connect the controllers 130, 132, 134, and 136 to the router 120. Each of the cables 140 can include a Category 3 cable, a Category 5 cable, a Category 5e cable, a Category 6 cable, or another suitable cable. In an embodiment, each cable 140 can be configured to support a data rate of at least 3 Mb/s, and in another embodiment, each cable can be configured to support a data rate of at most 100 Gb/s. While the system 100 of FIG. 1 is illustrated with four controllers 130, 132, 134, and 136, the system 100 may include more or fewer controllers.

Still referring to FIG. 1, the system 100 can also include a window frame panel 150 electrically connected to the controllers 130, 132, 134, and 136 via a plurality of sets of frame cables 152. The window frame panel 150 can include a plurality of non-light-emitting, variable transmission devices, each of which may be connected to its corresponding controller via its own frame cable. In the embodiment as illustrated, the non-light-emitting, variable transmission devices are oriented in a 3×9 matrix. In another embodiment, a different number of non-light-emitting, variable transmission devices, a different matrix of the non-light-emitting, variable transmission devices, or both may be used. Each of the non-light-emitting, variable transmission devices may be on separate glazings. In another embodiment, a plurality of non-light-emitting, variable transmission devices can share a glazing. For example, a glazing may correspond to a column of non-light-emitting, variable transmission devices in FIG. 1. A glazing may correspond to a plurality of column of non-light-emitting, variable transmission devices. In another embodiment, a pair of glazings in the window frame panel 150 can have different sizes, such glazings can have a different numbers of non-light-emitting, variable transmission devices. After reading this specification, skilled artisans will be able to determine a particular number and organization of non-light-emitting, variable transmission devices for a particular application.

In a particular, non-limiting embodiment, the window frame panel 150 can include a set 160 of non-light-emitting, variable transmission devices coupled to the controller 130 via a set of frame cables 152. The window frame panel 150 can also include a set 162 of non-light-emitting, variable transmission devices connected to the controller 132 via sets of frame cables 152. Moreover, the window frame panel 150 can include a set 164 of non-light-emitting, variable transmission devices connected to the controller 134 via other sets frame cables 152, and a set 166 of non-light-emitting, variable transmission devices connected to the controller 136 via further sets frame cables 152. While the system 100 of FIG. 1 is illustrated with the sets 160, 162, 164, and 166, the system 100 may include more or fewer sets of non-light-emitting, variable transmission devices.

The controllers 130, 132, 134, and 136 can provide regulated power to the sets 160, 162, 164, and 166 of non-light-emitting, variable transmission devices connected thereto via the sets of frame cables 152. The power provided to the sets 160, 162, 164, and 166 can have a voltage that is at most 12 V·A, at most 6 V·A, or at most 3 V·A. The controllers 130, 132, 134, and 136 can be used to control operation of the non-light-emitting, variable transmission devices within the sets 160, 162, 164, and 166. During operation, the non-light-emitting, variable transmission devices within the sets 160, 162, 164, and 166 act similar to capacitors. Thus, most of the power is consumed when the non-light-emitting, variable transmission devices are in their switching states, not in their static states.

In order to manage this power scheme, the system 100 can utilize the power ratings of the non-light-emitting, variable transmission devices for the sets 160, 162, 164, and 166 and allocate the power to these devices based on what the controllers 130, 132, 134, and 136 will need in order to provide full power to all non-light-emitting, variable transmission devices coupled to the router 120 via the controllers 130, 132, 134, and 136. The power ratings of the non-light-emitting, variable transmission devices of the sets 160, 162, 164, and 166 can be obtained from information that exists in conjunction with the non-light-emitting, variable transmission devices of the sets 160, 162, 164, and 166. For example, this information may be contained within an identification (ID) tag on each non-light-emitting, variable transmission device, within a look-up table provided in conjunction with these devices, information provided by the building management system 110, or an external source. Alternatively, this information can be obtained by an analog method, e.g., a resistance associated with each of these devices.

The allocation of power to the controllers 130, 132, 134, and 136 can be performed as part of a start-up routine after initial configuring or reconfiguring the system 100 or during a reboot of the system 100. The method of operation is described in greater detail below in conjunction with FIG. 4. With respect to a configuration, the system 100 can include a logic element, e.g., within the router 120 that can perform the method steps described below. In particular, the logic element can be configured to determine power requirements for the controllers coupled to the router and allocate power to the controllers corresponding to the power requirements. The voltage can then be regulated at the controllers 130, 132, 134, and 136 before being transmitted to the non-light-emitting, variable transmission devices coupled to each of the controllers 130, 132, 134, and 136 and the associated connectors and wiring (e.g., sets of frame cables 152) between the controllers 130, 132, 134, and 136 and their corresponding non-light-emitting, variable transmission devices. Each of the controllers and the router can have a power rating and a sum of the power ratings of the controllers can be greater than the power rating of the router. The system 100 can be configured such that the router can function at maximum capacity while the controller regulate the power distribution to the non-light-emitting, variable transmission devices.

Within the system 100, the power and the control signals for each of the controllers 130, 132, 134, and 136 can be configured to be transmitted over different conductors within the first cable. Specifically, the system 100 can be configured such that the power is transmitted over a first twisted pair of conductors of a cable, and the control signals are transmitted over a second twisted pair of conductors of the same cable.

Alternatively, the system 100 can also be configured such that at least part of the power and at least part of the control signals for a controller are transmitted over a same conductor of a cable.

The system can be used with a wide variety of different types of non-light-emitting variable transmission devices. The apparatuses and methods can be implemented with switchable devices that affect the transmission of light through a window. Much of the description below addresses embodiments in which the switchable devices are electrochromic devices. In other embodiments, the switchable devices can include suspended particle devices, liquid crystal devices that can include dichroic dye technology, and the like. Thus, the concepts as described herein can be extended to a variety of switchable devices used with windows.

Figure 3A:
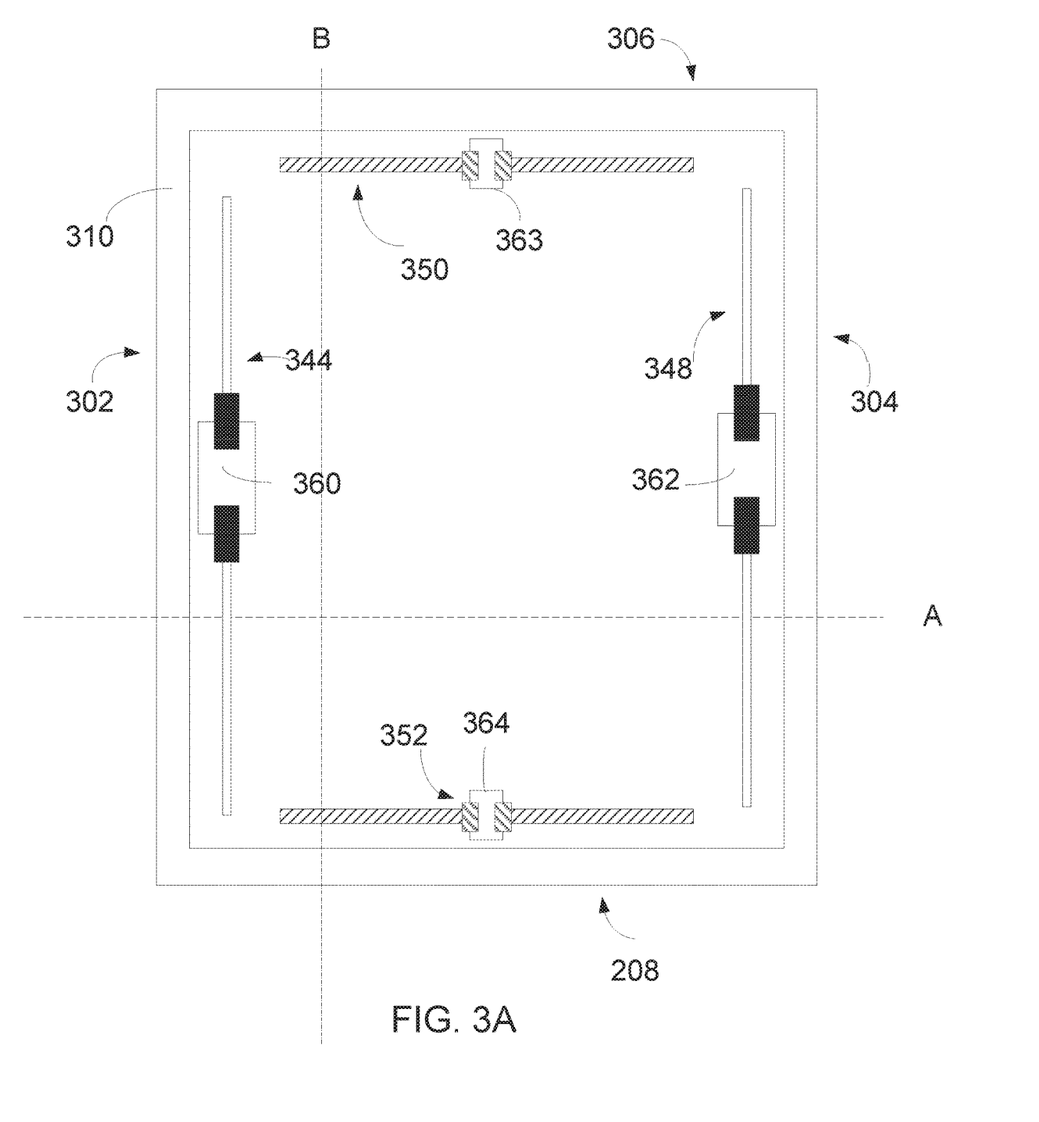
FIG. 3A includes an illustration of a top view of the substrate, the stack of layers, and the bus bars.
Figure 3B:
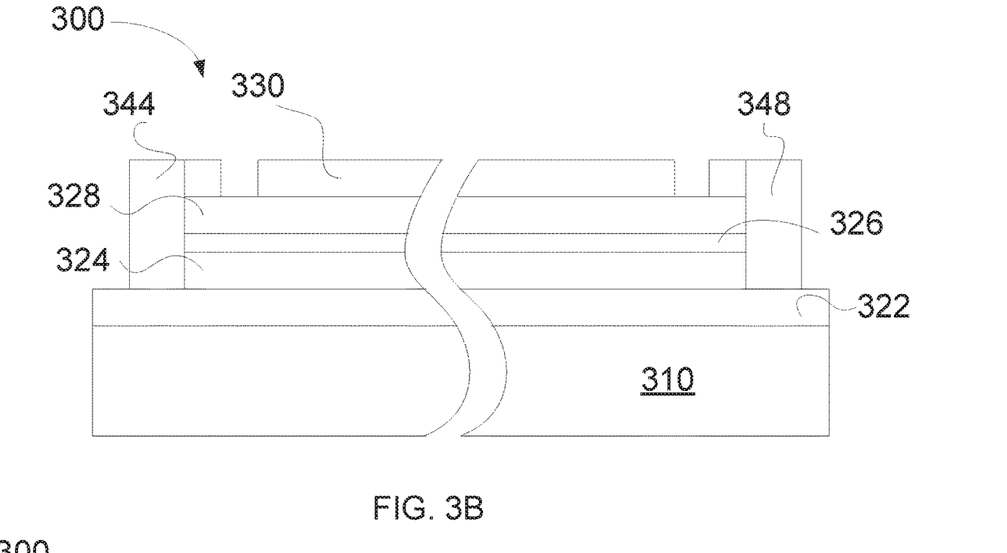
FIG. 3B includes an illustration of a cross-sectional view along line A of a portion of a substrate, a stack of layers for an electrochromic device, and bus bars, according to one embodiment.
Figure 3C:
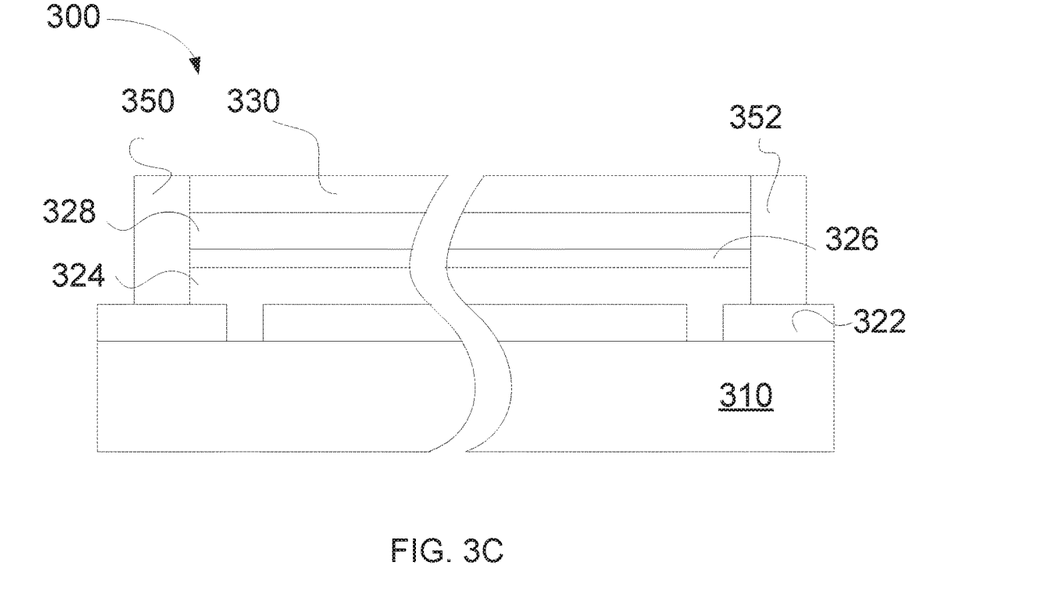
FIG. 3C includes an illustration of a cross-sectional view along line B of a portion of a substrate, a stack of layers for an electrochromic device, and bus bars, according to one embodiment.

The description with respect to FIGS. 3A-3C provide exemplary embodiments of a glazing that includes a glass substrate and a non-light-emitting variable transmission device disposed thereon. The embodiment as described with respect to 3A-3C is not meant to limit the scope of the concepts as described herein. In the description below, a non-light-emitting variable transmission device will be described as operating with voltages on bus bars being in a range of 0 V·A to 3 V·A. Such description is used to simplify concepts as described herein. Other voltage may be used with the non-light-emitting variable transmission device or if the composition or thicknesses of layers within an electrochromic stack are changed. The voltages on bus bars may both be positive (1 V·A to 4 V·A), both negative (−5 V·A to −2 V·A), or a combination of negative and positive voltages (−1 V·A to 2 V·A), as the voltage difference between bus bars are more important than the actual voltages. Furthermore, the voltage difference between the bus bars may be less than or greater than 3 V·A. After reading this specification, skilled artisans will be able to determine voltage differences for different operating modes to meet the needs or desires for a particular application. The embodiments are exemplary and not intended to limit the scope of the appended claims.

FIG. 3A an illustration of a top view of a substrate 310, a stack of layers of an electrochromic device 322, 324, 326, 328, and 330, and bus bars 344, 348, 350, and 352 overlying the substrate 300, according to one embodiment. In an embodiment, the substrate 310 can include a glass substrate, a sapphire substrate, an aluminum oxynitride substrate, or a spinel substrate. In another embodiment, the substrate 310 can include a transparent polymer, such as a polyacrylic compound, a polyalkene, a polycarbonate, a polyester, a polyether, a polyethylene, a polyimide, a polysulfone, a polysulfide, a polyurethane, a polyvinylacetate, another suitable transparent polymer, or a co-polymer of the foregoing. The substrate 310 may or may not be flexible. In a particular embodiment, the substrate 310 can be float glass or a borosilicate glass and have a thickness in a range of 0.5 mm to 4 mm thick. In another particular embodiment, the substrate 310 can include ultra-thin glass that is a mineral glass having a thickness in a range of 50 microns to 300 microns. In a particular embodiment, the substrate 310 may be used for many different non-light-emitting variable transmission devices being formed and may referred to as a motherboard.

The bus bar 344 lies along a side 302 of the substrate 310 and the bus bar 348 lies along a side 304 that is opposite the side 302. The bus bar 350 lies along side 306 of the substrate 310, and the bus bar 352 lies along side 308 that is opposite side 306. Each of the bus bars 344, 348, 350, and 352 have lengths that extend a majority of the distance each side of the substrate. In a particular embodiment, each of the bus bars 344, 348, 350, and 352 have a length that is at least 75%, at least 90%, or at least 95% of the distance between the sides 302, 304, 306, and 308 respectively. The lengths of the bus bars 344 and 348 are substantially parallel to each other. As used herein, substantially parallel is intended to means that the lengths of the bus bars 344 and 348, 350 and 352 are within 10 degrees of being parallel to each other. Along the length, each of the bus bars has a substantially uniform cross-sectional area and composition. Thus, in such an embodiment, the bus bars 344, 348, 350, and 352 have a substantially constant resistance per unit length along their respective lengths.

In one embodiment, the bus bar 344 can be connected to a first voltage supply terminal 360, the bus bar 348 can be connected to a second voltage supply terminal 362, the bus bar 350 can be connected to a third voltage supply terminal 363, and the bus bar 352 can be connected to a fourth voltage supply terminal 364. In one embodiment, the voltage supply terminals can be connected to each bus bar 344, 348, 350, and 352 about the center of each bus bar. In one embodiment, each bus bar 344, 348, 350, and 352 can have one voltage supply terminal. The ability to control each voltage supply terminal 360, 362, 363, and 364 provide for control over grading of light transmission through the electrochromic device 124.

In one embodiment, the first voltage supply terminal 360 can set the voltage for the bus bar 344 at a value less than the voltage set by the voltage supply terminal 363 for the bus bar 350. In another embodiment, the voltage supply terminal 363 can set the voltage for the bus bar 350 at a value greater than the voltage set by the voltage supply terminal 364 for the bus bar 352. In another embodiment, the voltage supply terminal 363 can set the voltage for the bus bar 350 at a value less than the voltage set by the voltage supply terminal 364 for the fourth bus bar 352. In another embodiment, the voltage supply terminal 360 can set the voltage for the bus bar 344 at a value about equal to the voltage set by the voltage supply terminal 362 for the bus bar 348. In one embodiment, the voltage supply terminal 360 can set the voltage for the bus bar 344 at a value within about 0.5 V·A, such as 0.4 V·A, such as 0.3 V·A, such as 0.2 V·A, such as 0.1 V·A to the voltage set by the voltage supply terminal 362 for the second bus bar 348. In a non-limiting example, the first voltage supply terminal 360 can set the voltage for the bus bar 344 at 0 V·A, the second voltage supply terminal 362 can set the voltage for the bus bar 348 at 0 V·A, the third voltage supply terminal 363 can set the voltage for the bus bar 350 at 3 V·A, and the fourth voltage supply terminal 364 can set the voltage for the bus bar 352 at 1.5 V·A.

The compositions and thicknesses of the layers are described with respect to FIGS. 3B and 3C. Transparent conductive layers 322 and 330 can include a conductive metal oxide or a conductive polymer. Examples can include a tin oxide or a zinc oxide, either of which can be doped with a trivalent element, such as Al, Ga, In, or the like, a fluorinated tin oxide, or a sulfonated polymer, such as polyaniline, polypyrrole, poly(3,4-ethylenedioxythiophene), or the like. In another embodiment, the transparent conductive layers 322 and 330 can include gold, silver, copper, nickel, aluminum, or any combination thereof. The transparent conductive layers 322 and 330 can have the same or different compositions.

The set of layers further includes an electrochromic stack that includes the layers 324, 326, and 328 that are disposed between the transparent conductive layers 322 and 330. The layers 324 and 328 are electrode layers, wherein one of the layers is an electrochromic layer, and the other of the layers is an ion storage layer (also referred to as a counter electrode layer). The electrochromic layer can include an inorganic metal oxide electrochemically active material, such as $WO_3$, $V_2O_5$, $MoO_3$, $Nb_2O_5$, $TiO_2$, CuO, $Ir_2O_3$, $Cr_2O_3$, $Co_2O_3$, $Mn_2O_3$, or any combination thereof and have a thickness in a range of 50 nm to 2000 nm. The ion storage layer can include any of the materials listed with respect to the electrochromic layer or $Ta_2O_5$, $ZrO_2$, $HfO_2$, $Sb_2O_3$, or any combination thereof, and may further include nickel oxide (NiO, $Ni_2O_3$, or combination of the two), and Li, Na, H, or another ion and have a thickness in a range of 80 nm to 500 nm. An ion conductive layer 326 (also referred to as an electrolyte layer) is disposed between the electrode layers 324 and 328, and has a thickness in a range of 20 microns to 60 microns. The ion conductive layer 326 allows ions to migrate therethrough and does not allow a significant number of electrons to pass therethrough. The ion conductive layer 326 can include a silicate with or without lithium, aluminum, zirconium, phosphorus, boron; a borate with or without lithium; a tantalum oxide with or without lithium; a lanthanide-based material with or without lithium; another lithium-based ceramic material; or the like. The ion conductive layer 326 is optional and, when present, may be formed by deposition or, after depositing the other layers, reacting portions of two different layers, such as the electrode layers 324 and 328, to form the ion conductive layer 326. After reading this specification, skilled artisans will appreciate that other compositions and thicknesses for the layers 322, 324, 326, 328, and 330 can be used without departing from the scope of the concepts described herein.

The layers 322, 324, 326, 328, and 330 can be formed over the substrate 210 with or without any intervening patterning steps, breaking vacuum, or exposing an intermediate layer to air before all the layers are formed. In an embodiment, the layers 322, 324, 326, 328, and 330 can be serially deposited. The layers 322, 324, 326, 328, and 330 may be formed using physical vapor deposition or chemical vapor deposition. In a particular embodiment, the layers 322, 324, 326, 328, and 330 are sputter deposited.

In the embodiment illustrated in FIGS. 3B and 3C, each of the transparent conductive layers 322 and 330 include portions removed, so that the bus bars 344/348 and 350/352 are not electrically connected to each other. Such removed portions are typically 20 nm to 2000 nm wide. In a particular embodiment, the bus bars 344 and 348 are electrically connected to the electrode layer 324 via the transparent conductive layer 322, and the bus bars 350 and 352 are electrically connected to the electrode layer 328 via the transparent conductive layer 330. The bus bars 344, 348, 350, and 352 include a conductive material. In an embodiment, each of the bus bars 344, 348, 350, and 352 can be formed using a conductive ink, such as a silver frit, that is printed over the transparent conductive layer 322. In another embodiment, one or both of the bus bars 344, 348, 350, and 352 can include a metal-filled polymer. In a particular embodiment (not illustrated), the bus bars 350 and 352 are each a non-penetrating bus bar that can include the metal-filled polymer that is over the transparent conductive layer 330 and spaced apart from the layers 322, 324, 326, and 328. The viscosity of the precursor for the metal-filled polymer may be sufficiently high enough to keep the precursor from flowing through cracks or other microscopic defects in the underlying layers that might be otherwise problematic for the conductive ink. The lower transparent conductive layer 322 does not need to be patterned in this particular embodiment. In one embodiment, bus bars 344 and 348 are opposed each other. In one embodiment, bus bars 350 and 352 are orthogonal to bus bar 344.

In the embodiment illustrated, the width of the non-light-emitting variable transmission device $W_{EC}$ is a dimension that corresponds to the lateral distance between the removed portions of the transparent conductive layers 322 and 330. $W_S$ is the width of the stack between the bus bars 344 and 348. The difference in $W_S$ and $W_{EC}$ is at most 5 cm, at most 2 cm, or at most 0.9 cm. Thus, most of the width of the stack corresponds to the operational part of the non-light-emitting variable transmission device that allows for different transmission states. In an embodiment, such operational part is the main body of the non-light-emitting variable transmission device and can occupy at least 90%, at least 95%, at least 98% or more of the area between the bus bars 344 and 348.

Attention is now addressed to installing, configuring, and using the system as illustrated in FIG. 1 with glazings and non-light-emitting, variable transmission devices that can be similar to the glazing and non-light-emitting, variable transmission device as illustrated and described with respect to FIGS. 3A-3C. In another embodiment, other designs of glazings and non-light-emitting, variable transmission devices.

Figure 4:
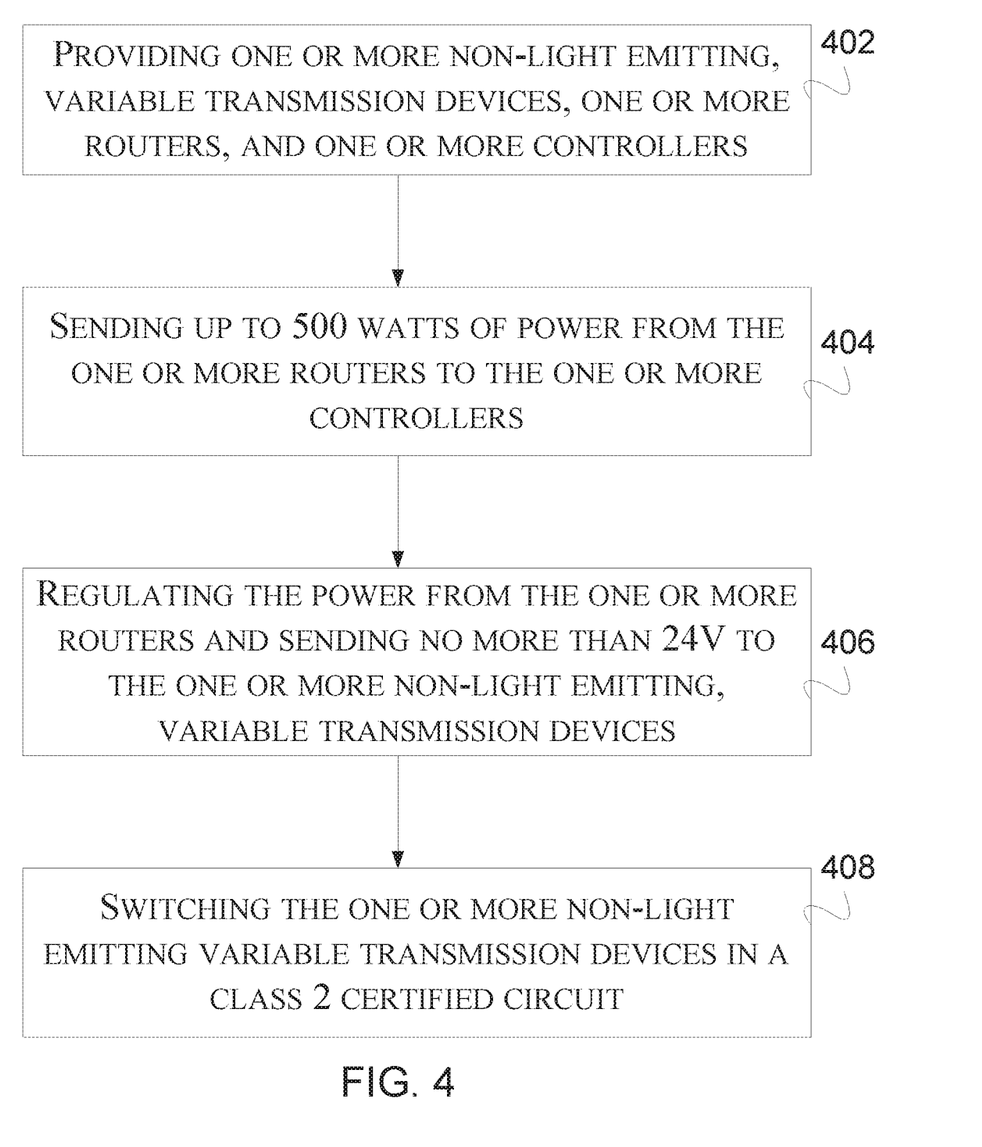
FIG. 4 includes a flow diagram for operating the system of FIG. 1 or 2.

FIG. 4 includes flow chart for a method 400 of operating the system 100 illustrated in FIG. 1. Commencing at block 402, the method can include providing one or more non-light-emitting, variable transmission devices, one or more routers, and one or more controllers coupled to the one or more glazings and the one or more routers. In an embodiment, the non-light-emitting, variable transmission devices, routers, and controllers may be connected to each other as illustrated in FIG. 1 and use non-light-emitting variable transmission devices similar to the non-light-emitting variable transmission device described and illustrated in FIGS. 3A-3B.

The building management system 110 can include logic to control the operation of building environmental and facility controls, such as heating, ventilation, and air conditioning (HVAC), lights, scenes for EC devices, including the EC device 300. The logic for the building management systems 110 can be in the form of hardware, software, or firmware. In an embodiment, the logic may be stored in a field programmable gate array (FPGA), an application-specific integrated circuit (ASIC), a hard drive, a solid state drive, or another persistent memory. In an embodiment, the building management system 110 may include a processor that can execute instructions stored in memory within the building management system 110 or received from an external source.

Continuing the description of the method 400, at block 404, the method can include sending up to 500 watts of power from the router 120 to the controllers 130, 132, 134, and 136. The power supply within the router 120 can operate at full capacity within a class 2 certified circuit and is no longer limited in sending at most 100 watts of power.

After receiving the power from the router 120, each of the one or more controllers 130, 132, 134, and 136 can regulate the power before sending at most 24 V·A of power to each of the one or more non-light emitting, variable transmission devices, at block 406. The circuit maintains a class 2 certification as the controllers 130, 132, 134, and 136 regulate the amount of power distributed to one or more non-light emitting, variable transmission devices. In one embodiment, the controller can have a half bridge circuit device, such as a chip, to limit the current sent to the one or more non-light emitting, variable transmission devices. In another embodiment, the controllers 130, 132, 134, and 136, receive a shut off command to regulate the power to the one or more non-light emitting, variable transmission devices. In such an embodiment, the controllers 130, 132, 134, and 136, turns off the circuit such that the one or more non-light emitting, variable transmission devices do not receive power. In yet another embodiment, the controllers 130, 132, 134, and 136 can have a fuse to ensure that the 100 V·A is not exceeded. In other words, in one embodiment, the controllers 130, 132, 134, and 136 can each include a fuse to regulate the power to be less than 100 V·A.

The system 100 can be used to regulate the transmission of an IGU installed as part of architectural glass along a wall of a building or a skylight, or within a vehicle. As the number of EC devices for a controlled space increases, the complexity in controlling the EC devices can also increase. Even further complexity can occur when the control of the EC devices is integrated with other building environmental controls. In an embodiment, the window can be skylight that may include over 900 EC devices.

The method 400 can include switching the one or more non-light emitting, variable transmission devices in a class 2 certified circuit, at block 408. In one embodiment, the one or more non-light emitting, variable transmission devices switch from full clear to full tint in a class 2 certified circuit. In another embodiment, the one or more non-light emitting, variable transmission devices switch from full tint to full clear in a class 2 certified circuit. In one embodiment, the one or more non-light emitting, variable transmission devices switch from full clear to graded tint or transmission in a class 2 certified circuit. In another embodiment, the one or more non-light emitting, variable transmission devices switch from full tint to graded tint or transmission in a class 2 certified circuit. The one or more non-light emitting, variable transmission devices can be switched to one of eight graded states and one of four tint levels. The four tint levels can be selected from the group consisting of full tint, medium tint, light tint, and full clear. The graded states can be selected from the group consisting of uniform full tint, uniform full clear, uniform light tint, uniform medium tint, full gradient (from top to bottom), inverse full gradient (from bottom to top), light gradient, and inverse light gradient. In one embodiment full clear can be at least 80% transmittance, such as at least 90% transmittance, such as at least 95% transmittance, such as 99% transmittance. In one embodiment, full tint can be no more than 15% transmittance, such as no more than 12% transmittance, no more than 8% transmittance, no more than 6% transmittance, or no more than 3% transmittance. In one embodiment, full tint has less transmittance than medium tint. In another embodiment, medium tint has less transmittance than light tint. In one embodiment, full gradient can have about 95% transmittance in about the first $\frac{1}{3}^{rd}$ of the device, about 45% transmittance in the second $\frac{1}{3}^{rd}$ of the device, and about 6% transmittance in the third $\frac{1}{3}^{rd}$ of the device.

After reading this specification, skilled artisans will understand that the order of actions in FIG. 4 may be changed. Furthermore, one or more actions may not be performed, and one or more further actions may be performed in generating the collection of scenes.

After the collection of scenes is generated, a scene from the collection can be selected, and a control device can control the EC devices of the window to achieve scene for the window.

Embodiments as described above can provide benefits over other systems with non-light-emitting, variable transmission devices. The use of controllers to regulate the power supply to the non-light emitting, variable transmission devices maintains the safety of the system, utilizes the full capacity of the power supply, and maintains a class 2 circuit for the system thereby reducing the cost to the end consumer.

Many different aspects and embodiments are possible. Some of those aspects and embodiments are described below. After reading this specification, skilled artisans will appreciate that those aspects and embodiments are only illustrative and do not limit the scope of the present invention. Exemplary embodiments may be in accordance with any one or more of the ones as listed below.

Embodiment 1. A system for providing power can include one or more non-light emitting, variable transmission devices, a power device, and one or more class 2 certified controllers, where the power device is configured to provide up to 500 Watts of power to the one or more controllers, and where the controller is configured to provide at most 24 V·A to the one or more non-light emitting, variable transmission devices.

Embodiment 2. A method of controlling a non-light emitting, variable transmission devices can include providing one or more non-light emitting, variable transmission devices, at least one router, and one or more class 2 certified controllers, sending up to 500 watts of power from the at least one router to the one or more controllers, regulating the power from the at least one router, where regulating the power from the at least one router is by the one or more class 2 certified controllers, and sending no more than 24 V·A to the one or more non-light emitting, variable transmission devices.

Embodiment 3. The method or system of any one of embodiments 1 or 2, where the one or more non-light emitting, variable transmission devices is an electrochromic device.

Embodiment 4. The method of embodiment 2, can further include switching the one or more non-light emitting variable transmission devices from a first state to a second state.

Embodiment 5. The method or system of any one of embodiments 1 or 2, where each of the class 2 certified controllers further includes a half-bridge current limiting device.

Embodiment 6. The method or system of embodiment 5, wherein each of the half-bridge current limiting devices limits an output of power from the controller to at most 24 V·A.

Embodiment 7. The method of embodiment 2, wherein sending no more than 24 V·A to the one or more non-light emitting, variable transmission devices is done by the one or more class 2 certified controllers.

Embodiment 8. The method or system of any one of embodiments 1 or 2, further comprising one or more cables to connect the one or more controllers to the one or more non-light emitting, variable transmission devices after receiving up to 500 watts of power.

Embodiment 9. The method or system of any one of embodiments 1 or 2, wherein the one or more class 2 certified controllers sends no more than 12 V·A to the one or more non-light emitting, variable transmission devices after receiving up to 500 watts of power.

Embodiment 10. The method or system of any one of embodiments 1 or 2, wherein the one or more class 2 certified controllers sends no more than 8 V·A to the one or more non-light emitting, variable transmission devices after receiving up to 500 watts of power.

Embodiment 11. The method or system of any one of embodiments 1 or 2, wherein the one or more class 2 certified controllers sends no more than 3 V·A to the one or more non-light emitting, variable transmission devices after receiving up to 500 watts of power.

Embodiment 12. The method or system of any one of embodiments 1 or 2, wherein the one or more non-light emitting, variable transmission devices can include a substrate, a first transparent conductive layer, a second transparent conductive layer, an electrochromic layer disposed between the first transparent conductive layer and the second transparent conductive layer, and a counter electrode layer disposed between the first transparent conductive layer and the second transparent conductive layer.

Embodiment 13. The method or system of embodiment 12, wherein the substrate is a material selected from the group consisting of a glass, sapphire, aluminum oxynitride, spinel, polyalkene, polycarbonate, polyester, polyether, polyethylene, polyimide, polysulfone, polysulfide, polyurethane, polyvinylacetate, another suitable transparent polymer, or a co-polymer of the foregoing, borosilicate glass, and any combination thereof.

Embodiment 14. The method or system of embodiment 12, wherein the first transparent conductive layer is a material selected from the group consisting of a tin oxide, zinc oxide doped with a trivalent element, such as Al, Ga, In, a fluorinated tin oxide, a sulfonated polymer, polyaniline, polypyrrole, poly(3,4-ethylenedioxythiophene), and can include gold, silver, copper, nickel, aluminum, or any combination thereof.

Embodiment 15. The method or system of embodiment 12, where the second transparent conductive layer is a material selected from the group consisting of a tin oxide, zinc oxide doped with a trivalent element, such as Al, Ga, In, a fluorinated tin oxide, a sulfonated polymer, polyaniline, polypyrrole, poly(3,4-ethylenedioxythiophene), and can include gold, silver, copper, nickel, aluminum, and any combination thereof.

Embodiment 16. The method or system of embodiment 12, where the electrochromic layer is a material selected from the group consisting of $WO_3$, $V_2O_5$, $M_0O_3$, $Nb_2O_5$, $TiO_2$, CuO, $Ir_2O_3$, $Cr_2O_3$, $CO_2O_3$, $Mn_2O_3$, and any combination thereof.

Embodiment 17. The method or system of embodiment 12, where the counter electrode layer is a material selected from the group consisting of $Ta_2O_5$, $ZrO_2$, $HfO_2$, $Sb_2O_3$, nickel oxide (NiO, $Ni_2O_3$, or combination of the two), and doped with Li, Na, and H, and any combination thereof.

Embodiment 18. The method of embodiment 4, where the first state is full clear and the second state is full tint.

Embodiment 19. The method of embodiment 4, where the first state is full tint and the second state is full clear.

Embodiment 20. The method of embodiment 4, where the first state is full clear and the second state is graded tint.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A method of controlling a non-light emitting, variable transmission device, comprising:
    providing one or more non-light emitting, variable transmission devices, at least one router, and one or more class 2 certified controllers;
    sending up to 500 watts of power from the at least one router to the one or more controllers;
    regulating the power from the at least one router, wherein regulating the power from the at least one router is by the one or more class 2 certified controllers; and
    sending no more than 24 VA to each of the one or more non-light emitting, variable transmission devices.

2. The method of claim 1, wherein sending no more than 24 VA to the one or more non-light emitting, variable transmission devices is done by the one or more class 2 certified controllers.

3. The method of claim 1, further comprising switching the one or more non-light emitting variable transmission devices from a first state to a second state.

4. The method of claim 3, wherein the first state is full clear and the second state is full tint.

5. The method of claim 3, wherein the first state is full tint and the second state is full clear.

6. The method of claim 3, wherein the first state is full clear and the second state is graded tint.

7. A method of controlling a non-light emitting, variable transmission device, comprising:
    providing one or more non-light emitting, variable transmission devices, at least one router, and one or more class 2 certified controllers;
    sending up to 500 watts of power from the at least one router to the one or more controllers;
    regulating the power from the at least one router, wherein regulating the power from the at least one router is by the one or more class 2 certified controllers; and
    sending no more than 24 V·A to each of the one or more non-light emitting, variable transmission devices, sending no more than 12 V·A to each of the one or more non-light emitting is by the one or more class 2 certified controllers.

8. The method of claim 7, wherein the one or more class 2 certified controllers sends no more than 8 V·A to the one or more non-light emitting, variable transmission devices after receiving up to 500 watts of power.

9. The method of claim 7, wherein the one or more class 2 certified controllers sends no more than 3 V·A to the one or more non-light emitting, variable transmission devices after receiving up to 500 watts of power.

10. The method of claim 1, wherein the one or more non-light emitting, variable transmission devices comprises:
    a substrate;
    a first transparent conductive layer;
    a second transparent conductive layer;
    an electrochromic layer disposed between the first transparent conductive layer and the second transparent conductive layer; and
    a counter electrode layer disposed between the first transparent conductive layer and the second transparent conductive layer.

11. The method of claim 10, wherein the substrate is a material selected from the group consisting of a glass, sapphire, aluminum oxynitride, spinel, polyalkene, polycarbonate, polyester, polyether, polyethylene, polyimide, polysulfone, polysulfide, polyurethane, polyvinylacetate, another suitable transparent polymer, or a co-polymer of the foregoing, borosilicate glass, and any combination thereof.

12. The method of claim 10, wherein the first transparent conductive layer is a material selected from the group consisting of a tin oxide, zinc oxide doped with a trivalent element, such as Al, Ga, In, a fluorinated tin oxide, a sulfonated polymer, polyaniline, polypyrrole, poly(3,4-ethylenedioxythiophene), and can include gold, silver, copper, nickel, aluminum, or any combination thereof.

13. The method of claim 10, wherein the second transparent conductive layer is a material selected from the group consisting of a tin oxide, zinc oxide doped with a trivalent element, such as Al, Ga, In, a fluorinated tin oxide, a sulfonated polymer, polyaniline, polypyrrole, poly(3,4-ethylenedioxythiophene), and can include gold, silver, copper, nickel, aluminum, and any combination thereof.

14. The method of claim 10, wherein the electrochromic layer is a material selected from the group consisting of $WO_3$, $V_2O_5$, $MoO_3$, $Nb_2O_5$, $TiO_2$, $CuO$, $Ir_2O_3$, $Cr_2O_3$, $Co_2O_3$, $Mn_2O_3$, and any combination thereof.

15. The method of claim 10, wherein the counter electrode layer is a material selected from the group consisting of $Ta_2O_5$, $ZrO_2$, $HfO_2$, $Sb_2O_3$, nickel oxide ($NiO$, $Ni_2O_3$, or combination of the two), and doped with Li, Na, and H, and any combination thereof.

16. A system for providing power, comprising:
    one or more non-light emitting, variable transmission devices;
    a power device; and
    one or more class 2 certified controllers, wherein the power device is configured to provide up to 500 Watts of power to the one or more controllers, and wherein the controller is configured to provide at most 24 V·A to the one or more non-light emitting, variable transmission devices.

17. The system of claim 16, wherein the one or more non-light emitting, variable transmission devices is an electrochromic device.

18. The system of claim 16, wherein each of the class 2 certified controllers further includes a half-bridge current limiting device.

19. The system of claim 18, wherein each of the half-bridge current limiting devices limits an output of power from the controller to at most 24 V·A.

20. The system of claim 16, further comprising one or more cables to connect the one or more controllers to the one or more non-light emitting, variable transmission devices after receiving up to 500 watts of power.

* * * * *